United States Patent Office 2,743,626
Patented May 1, 1956

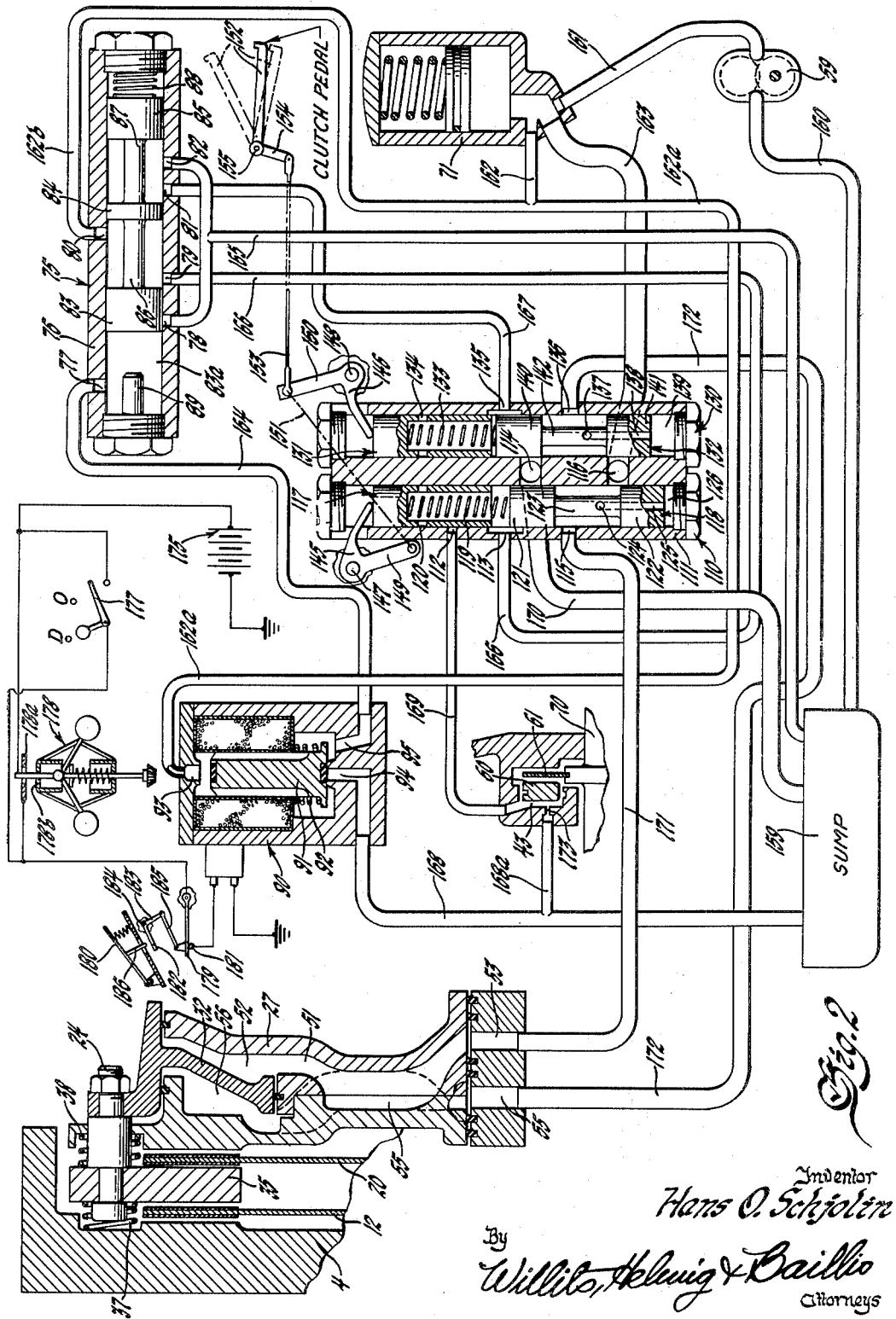

2,743,626

TRANSMISSION AND CONTROLS

Hans O. Schjolin, Birmingham, Mich., assignor to General Motors Corporation, Detroit, Mich., a corporation of Delaware Application May 20, 1952, Serial No. 288,966

22 Claims. (Cl. 74—472)

This invention relates to transmissions and more particularly to a two speed overdrive transmission for use in conjunction with a manually shiftable plural speed transmission and to the control system therefor. The transmission is particularly adapted for heavy duty service as experienced in the operation of trucks and busses.

By this invention there is provided a double acting clutch and planetary gearing unit of compact structure arranged to provide neutral, direct drive, or overdrive operation as selected by a hydraulic control system. Means are incorporated to render the hydraulic control system automatically operable to provide for direct drive through the automatic transmission unit at vehicle speeds up to a predetermined maximum and to automatically provide for overdrive operation at vehicle speeds above said maximum speed. In addition, means are provided to enable the vehicle operator to render the automatic operation of the control system inoperative and to select either direct or overdrive operation at vehicle speeds less than said maximum vehicle speed, as desired.

An additional feature is the provision of a manually operable clutch brake which may be rendered operative during shifting of the manual transmission unit to enable rapid shifting of the gear ratio in the manually shiftable transmission unit.

Still another feature of the transmission is the neutral control whereby selection of neutral in the automatic unit is achieved positively through action of hydraulic pressure applied to opposite sides of the clutch control piston.

A further feature of this invention is the provision of an accelerator pedal operated overcontrol effective to provide for downshift from overdrive to direct drive operation when the accelerator pedal is moved past its fully open engine throttle position.

An additional feature is found in the actuation of clutch pressure regulating valves both by the vehicle clutch pedal and by means of a fluid pressure actuated valve under the control of a solenoid valve.

These and other features of this invention will be apparent from the following specification and claims taken in conjunction with the drawings in which:

Figure 2 is a schematic diagram of the control system for the automatic transmission unit of Figure 1.

Figure 1:
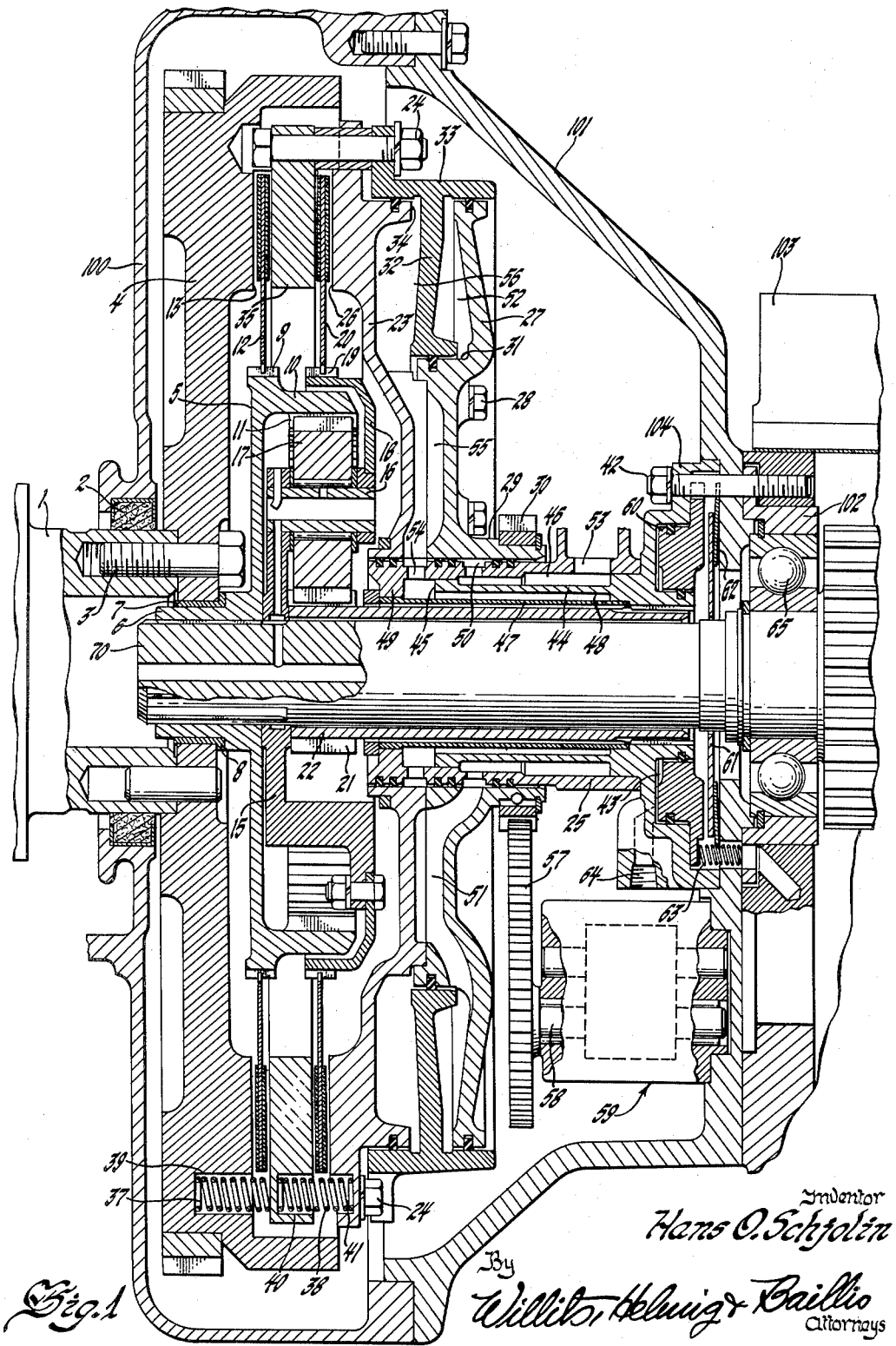
Figure 1 is a partially sectional view of the automatically controlled two speed transmission unit.

Referring to the drawings, in Figure 1 there is shown a hydraulically actuated double acting clutch and planetary transmission unit adapted to be positioned between a vehicle engine (not shown) and a manually shiftable transmission (not shown) which may be of the customary slide gear type. The planetary transmission and clutch arrangement is designed to provide for neutral or no-drive, direct drive, or overdrive operation as determined by the control system of Figure 2, hereafter described.

The automatic transmission unit of Figure 1 includes a transmission housing 100 adapted to be bolted to a housing section 101 which is bolted to a housing 102 and a housing 103 which may enclose a plural speed manually shiftable slide gear transmission of conventional construction, not shown. An engine driven shaft 1 is rotatably supported in housing section 100, there being an oil seal 2 disposed between shaft 1 and housing 100. Fixed to shaft 1 by bolts 3 is a clutch drum 4. A clutch hub 5 is splined to a power output shaft 70, the clutch hub having an axial flange 6 for supporting the hub upon shaft 70. Intermediate the flange 6 and drum 4 is a sleeve bearing 7 having a radially extending end flange 8 adapted to retain the bearing in place in assembled relationship. Thus, one end of power input shaft 1 and clutch drum 4 are supported upon shaft 70 through bearing 7 and flange 6 of clutch hub 5. Clutch hug 5 is shaped to include outwardly facing splines 9 and an axially extending flange 10 on which is formed an internal ring gear 11 of a planetary gearing unit. A clutch plate 12 carried by splines 9 extends radially outwardly into close proximity to a friction surface 13 of clutch drum 4. Friction surfaces of any suitable type may be carried by clutch plate 12.

A planet carrier 15 is rotatably mounted on the power output shaft 70, the carrier supporting a stub shaft 16 on which is supported a planet gear 17 rotatably mounted on stub shaft 16. An extension 18 of carrier 15 protrudes radially outwardly and then axially laterally to a point immediately above flange 10 of clutch hub 5 and carries a plurality of splines 19 adapted to receive a clutch plate 20. A sun gear 21 carried by a sleeve 22 is fixed against rotation, the sleeve 22 being splined to a housing 104. While only a single planet gear is illustrated, it will be understood that a plurality, preferably three, of such gears are included in the planetary gearing arrangement.

A radially extending disc or plate member 23 is bolted to clutch drum 4 by a plurality of bolts 24. The base of plate 23 is supported upon a sleeve 25, the plate being provided with a friction surface 26 adapted to be engaged by clutch plate 20. A second disc or plate member 27 is bolted to plate 23 by bolts 28, plate 27 being provided with an axially extending flange 29 supported upon sleeve 25 and carrying a pump drive gear 30 thereon. Plate member 27 is shaped to include an axially protruding flange 31 adapted to support the base of a piston 32 mounted for axial movement with respect to plates 23 and 27. Piston 32 is formed with a flange 33 adapted to contact the upper extremity of plate 27 and a flange 34 formed on plate 23. Rubber seals are provided between piston 32 and the upper extremity of plate 27, flange 31 and flange 34 formed on plate 23.

A clutch presser plate 35 is positioned intermediate clutch plates 12 and 20, the plate 35 being secured to piston 32 by means of bolts 24. A pair of coil springs 37 and 38 yieldably bias presser plate 35 to a neutral position out of contact with both clutch plates 12 and 20. Spring 37 is pocketed in a recess 39 in clutch drum 4 and bears against one edge of presser plate 35, while spring 38 is pocketed in a recess 40 in presser plate 35 and in a recess 41 in plate member 23. The springs act in opposition to each other tending to assure a neutral or no-drive condition of operation when such operation is called for by the control system as hereafter described.

Bolted to housing section 101 by means of bolts 42 is a housing 104 shaped to form a cylinder 43 and including an axially extending sleeve 44 positioned within sleeve 25. The housing 104 is splined to sleeve 22 to prevent rotation of sun gear 21, while sleeve portion 44 is formed with an annular boss 45 for supporting sleeve 25. Sleeves 25 and 44 are spaced to form a fluid passage 46 therebetween. Radially inwardly from sleeve 44 is a sleeve 47 spaced from sleeve 44 to provide a second fluid pressure passage 48. One end of sleeve 25 is formed with an inwardly extending annular boss 49 contacting sleeve 47 and blocking one end of passage 48. Sleeve 25 is drilled at 50 to admit fluid pressure from passage 46 to a passage 51 leading to a fluid pressure chamber 52 at one side of piston 32. Fluid pressure may be admitted to passage 46 through a port 53 in sleeve 25. Sleeve 25 is also drilled at 54 to admit fluid pressure from passage 48 to a passage 55 leading to a pressure chamber 56 at the opposite side of piston 32 from chamber 52. Fluid pressure may be admitted to passage 48 through a suitable gland not shown in Figure 1.

Pump drive gear 39 meshes with a gear 57 for driving a pump shaft 58 of a suitable pump 59, which may be a standard gear type pump. Thus pump 59 is effective whenever the engine is in operation.

A piston 60 disposed within cylinder 43 may be actuated by fluid pressure to operate a clutch brake 61 secured to power shaft 70 for braking shaft 70 during the interval in which gear ratio shift is accomplished in the manually shiftable transmission. The piston 43 is yieldably biased to be out of contact with friction surface 62 carried by bolt 42 by a spring 63. When fluid pressure is admitted to port 64 by the control system hereafter described, piston 60 applies clutch brake 61 to the housing section 101 to rapidly retard rotation of shaft 70, thereby minimizing the time required to accomplish shifts in the manual shift transmission unit. Otherwise stated, synchronization of the power input shaft 70 to the manual transmission unit output shaft is rapidly accomplished through action of clutch brake 61. In the absence of clutch brake 61, it is necessary for the vehicle operator to wait until the inertia forces of shaft 70, the planetary gearing unit, and clutch plates 12 and 20 are dissipated to accomplish smooth shift of the manual transmission unit. The clutch brake quickly slows down shaft 70 for rapid shift of the manual unit.

A housing section 102 bolted to housing 101 supports a bearing 65 for the rear end of shaft 70. Shaft 70, which is the power output shaft of the automatic overdrive unit, is also the power input shaft for the manually shiftable transmission unit.

Fluid pressure may be admitted to chamber 43 to actuate clutch brake 61 when the vehicle clutch pedal is depressed past its normal range of movement as hereafter more fully explained.

Application of fluid pressure to pressure chamber 52 forces piston 32 to apply presser plate 35 to clutch plate 12, to lock the plate to drum 4. Direct drive then results, the power flow being from drum 4 to clutch plate 12 to clutch hub 5 splined to shaft 70. Overdrive through the planetary unit is accomplished by admitting fluid pressure to pressure chamber 56 thereby locking presser plate 35 to clutch plate 20. Drive is thereby transferred from drum 4 to clutch plate 20, extension 18 of planet carrier 15, stub shaft 16, planet gears 17, ring gear 11 and clutch hub 5 to shaft 70. As heretofore stated, sun gear 21 is fixed against rotation, the sun gear acting as a reaction member for overdrive operation.

Referring to Figure 2, there is shown a schematic diagram for the automatic overdrive unit of Figure 1. In Figure 2, the same numbers are applied to similar parts shown in Figure 1.

The control system includes, in general, engine driven pump 59, an accumulator 71, a fluid pressure operated selector valve 75, a solenoid valve 90, a pair of clutch pressure regulator valves indicated generally at 110 and 130, a governor 178, a high-low switch 177, and an accelerator pedal operated switch 179. Current for actuating the solenoid valve 90 may be provided by the vehicle battery 175.

Selector valve 75 includes a casing 76 provided with ports 77, 78, 79, 80, 81 and 82. The valve 75 is made up of lands 83, 84 and 85 joined by reduced portions 86 and 87. A spring 88 yieldably urges valve 75 toward a stop member 89. Port 77 leads to a pressure chamber 83a at one end of the valve, the port 77 being connected to a passage 164. Ports 78 and 82 both connect to a pressure exhaust passage 165 leading to sump 159. Port 79 connects to passage 166, while port 80 connects to pressure supply passage 162b. Port 81 connects to passage 167.

Solenoid valve 90 is made up of a valve member 91 yieldably biased to the position illustrated by a spring 92. The valve casing includes port 93 connected to pressure supply passage 162a, port 94 leading to exhaust passage 168 and port 95 connected to port 77 of valve 75 by passage 164. When the solenoid valve is energized, valve 90 moves against spring 92 to block off pressure supply port 93 and to connect passages 164 and 168 by way of ports 94 and 95. The solenoid valve is controlled by a governor 178 and by a high-low switch 177 and by an accelerator pedal controlled switch 179 connected to a vehicle battery 175. High-low switch 177 may be mounted on the vehicle instrument panel or steering column for operation by the vehicle driver to select overdrive operation at vehicle speeds wherein the governor functions to select direct drive operation. The governor 178 is driven by the vehicle tail shaft to be responsive to vehicle speed and is calibrated to provide for direct drive operation at vehicle speeds less than a given maximum, for example, 45 miles per hour. At vehicle speeds above said maximum speed, the governor functions to cause overdrive operation. Otherwise stated, with switch 177 open, governor 178 is effective to provide direct drive operation at vehicle speeds below 45 miles per hour and overdrive operation thereafter. With switch 177 closed, the solenoid valve is energized for overdrive operation irrespective of governor function. This switch 177 constitutes a manual overcontrol of the governor.

A pair of clutch pressure regulator valves 110 and 130 are shown in the center of Figure 2. Valve 110 is made up of a housing 111 having ports 112, 113, 114, 115 and 116 therein. The valve includes two slidable valve sections 117 and 118 having a spring 119 disposed therebetween. Section 117 is provided with a port 120 adapted to control the clutch brake 61 of Figure 1. Section 117 is hollow to receive spring 119, the hollow portion of the valve acting as a fluid pressure conduit and being adapted to cut off port 113 when pressed to its innermost position against spring 119. Valve section 118 is formed of a pair of lands 121 and 122 joined by a reduced section 123. Reduced portion 123 and land 122 are drilled at 124 and 125 to admit fluid pressure to chamber 126 below the valve.

Port 120 may communicate with port 112 to admit fluid pressure to clutch brake cylinder 43 by way of passage 169 when fully depressed. Port 113 communicates with port 79 of selector valve 75 by way of passage 166. Port 114 exhausts to sump through passage 170. Port 115 connects to port 53 and chamber 52 of piston 32 by way of passage 171. Port 116 is a fluid pressure supply port for both valves 118 and 132 hereafter described.

Clutch pressure regulating valve 130 is of similar construction to valve 110, being made up of two valve sections 131 and 132, there being a spring 133 therebetween. Section 131 is hollow to receive spring 133 and is ported at 134, port 134 being adapted to communicate with port 112 and clutch brake passage 169 when the valve is fully depressed. Section 132 is provided with ports 135, 114, 136 and 116. Section 132 is drilled at 137 and 138 to admit fluid pressure to chamber 139 beneath the valve. The valve section 132 is made up of two lands 140 and 141 joined by reduced stem portion 142. It will be noted that ports 114 and 116 are common to both valves 118 and 132.

Port 135 is connected to port 81 of valve 75 by passage 167. Port 114, common to both valves 110 and 130, exhausts to sump through passage 170. Port 136 is connected to port 55 and overdrive pressure chamber 56 by way of passage 172. Port 116 supplies pump pressure to both valves 118 and 130 by way of passage 163.

Clutch pressure regulator valve sections 117 and 131 may be forced downwardly against springs 119 and 133 by fingers 145 and 146 pivotally mounted at 147 and 148, respectively. An arm 149 rigid with finger 145 is connected to an arm 150 rigid with finger 146 by a link 151. Arm 150 is connected to the vehicle clutch control pedal 152 through link 153 and arm 154 rigid with the clutch control pedal. Clutch pedal 152 is mounted for pivotal motion about point 155. Thus members 145 through 149, 146 through 150, and 152 through 154 are in effect bell crank levers. The clutch linkage is calibrated such that clutch pedal 152 may be moved through a normal range of motion to establish neutral or no-drive from shaft 1 to shaft 70 without applying clutch brake 61. Further downward motion of the clutch pedal beyond its normal travel range enables the vehicle operator to apply clutch brake 61 to slow down the rate of rotation of shaft 70.

In Figure 2 it will be noted that clutch brake pressure chamber 43 is in constant communication with exhaust passage 168 by branch 168a, there being a restriction 173 in the outlet from chamber 43. By this arrangement smooth application of the clutch brake is achieved and fluid trapping of pressure in chamber 43 is prevented.

An additional feature indicated in Figure 2 is the accelerator pedal operated overcontrol whereby the vehicle operator may, in emergency, override the governor to select direct drive through the automatic unit irrespective of governor action or the position of switch 177. A switch 179 is normally closed so that the governor will provide overdrive operation at vehicle speeds above 45 miles per hour. By pressing the accelerator pedal 180 past full throttle position, switch 179 may be opened, thereby de-energizing solenoid valve 90 for direct drive operation. The switch may be operated through a bell crank lever linkage or by any suitable mechanism such as a cam designed to leave switch 179 closed except when the accelerator pedal is depressed past the full throttle position. For instance, switch 179 may be pivoted at 181 and connected to a bell crank lever having arms 182 and 183 pivoted for rotation about point 184. Arm 183 may be connected to switch 179 by a link 185. A cam or boss 186 carried by the accelerator pedal is designed such that full engine throttle opening is achieved before boss 186 strikes arm 182 of the bell crank lever. After full engine throttle is achieved, further downward motion of the accelerator pedal 180 causes boss 186 to move the bell crank and linkage to open switch 179. Such action provides for direct drive through the gearing unit, whereupon the vehicle engine can speed up to quickly deliver power for emergencies.

*Operation of control system*

Engine driven pump 59 draws oil from sump 159 through passage 160, delivering the same to accumulator 71 through passage 161, to passage 162 and port 80 of valve 75 by branch passage 162b, to port 93 of solenoid valve 90 by branch passage 162a, and to port 116 common to both valves 110 and 130 by passage 163. Assuming switch 177 to be open, as is normally the case, and the vehicle is being started from a standing position, solenoid valve 90 is de-energized, the plunger 91 closing off exhaust port 94 and connecting ports 93 and 95 to permit flow of pressure fluid from passage 162a to port 77 of valve 75 by way of passage 164. This pressure, acting in chamber 83a on the end of valve 75, moves the valve against spring 88, thereby admitting pressure fluid from passage 162b to passage 166 leading to port 113 of valve 110. At the same time, passage 167 is connected to exhaust passage 165 through ports 81 and 82 of valve 75.

Upon depressing the vehicle clutch pedal to permit shifting of gear ratio in the manual transmission unit, fingers 145 and 146 force valve sections 117 and 131 against springs 119 and 133, respectively, whereupon valve section 117 forces valve section 118 downwardly to admit fluid pressure from passage 163 to passage 171 by way of ports 116 and 115. Valve section 132 is likewise forced downwardly to admit pressure fluid from passage 163 to passage 172 by way of ports 116 and 136. With fluid pressure existing in both passages 171 and 172, this pressure acts in pressure chambers 56 and 52 at opposite sides of piston 32, enabling springs 37 and 38 to position presser plate 35 out of contact with either clutch plate 12 or clutch plate 20. It is an important feature of this invention that neutral or no-drive is achieved by pressurizing both pressure chambers at opposite sides of the piston 32. It has been found in practice that a continuous leakage of fluid pressure through the piston seals is present in spite of all efforts to counteract such leakage. By continuously delivering pressure to both pressure chambers 56 and 52, such leakage is continuously made up so that the presser plate has no tendency to move toward either clutch engaging position. Clutch application is achieved by bleeding either chamber 56 or 52, while maintaining fluid pressure in the opposite chamber.

As the clutch pedal is released, fingers 145 and 146 are moved away from valve sections 117 and 118 to permit valve sections 118 and 132 to move upwardly toward the fingers. It will be noted that when valves 118 and 132 are moved downwardly to permit pressure from port 116 to enter passage 171 and 172 that pressure fluid is admitted through ports 124 and 125 in valve 118 to the fluid pressure chamber 126 beneath the valve. Likewise, fluid pressure is admitted through ports 137 and 138 of valve 132 to chamber 139 beneath the valve. This pressure in chambers 126 and 139 tends to move valves 118 and 132 against springs 119 and 133, respectively. In the case of valve 118, pressure in chamber 126 is ineffective to move the valve against spring 119 because of the effect of fluid pressure delivered to port 113 by way of passage 166, ports 80 and 79 of valve 75, and passage 162a. Port 135, of valve 132, however, is connected to exhaust through passage 167, ports 81 and 82 of valve 75 and passage 165. Thus, as the clutch pedal is released, valve 118 is fluid pressure balanced and remains in its down position whereby port 116 is able to deliver fluid pressure to direct drive clutch apply chamber 52 through port 115 and passage 171. Pressure fluid in chamber 139, however, causes valve 132 to move toward port 135 to connect chamber 56 to exhaust by way of passage 172, port 136, port 135, passage 167, ports 81 and 82 of valve 75 and passage 165. As the pressure is discharged from chamber 56, pressure acting in chamber 52 forces piston 32 to the left to apply presser plate 35 to clutch plate 12 for direct drive. This type of action continues through all gear ratios of the manual unit so long as switch 177 is open and the vehicle speed is less than a predetermined maximum, for example, 45 miles per hour. In Figure 2, valves 118 and 132 are illustrated in the position they assume when the clutch pedal has just started to be released from its neutral or clutch disengaging position.

When the vehicle speed reaches a predetermined maximum speed, governor 178 is effective to energize solenoid valve 90 by closing governor contacts 178a and 178b, whereupon plunger 91 moves against spring 92 to block off port 93 and connect ports 94 and 95. Such action exhausts passage 164 through passage 168, enabling spring 88 of valve 75 to move the valve to connect passage 166 to exhaust through ports 79—78 and passage 165, and to block off port 82 and admit pressure fluid from passage 162b to passage 167 through ports 80 and 81 of valve 75. Valve 118 is therefore no longer fluid pressure balanced, the pressure in chamber 126 being effective to move valve 118, exhaust passage 171 through port 115, port 114 and passage 170. Pressure admitted to passage 167 by way of ports 80 and 81 is admitted to the space adjacent spring 133 above land 140 of valve 130, this pressure being effective to move valve 130 to connect passage 163 to passage 172 by way of ports 116 and 136 for overdrive operation.

As heretofore stated, switch 177 may be operated manually by the vehicle operator to select continuous overdrive operation independent of governor action. When switch 77 is closed to energize solenoid valve 90, the double clutch unit will be maintained in overdrive at all vehicle speeds. It has been found, however, that when overdrive is selected by switch 177 emergencies may occur requiring maximum vehicle acceleration. It would, of course, be possible to change from overdrive to direct drive, provided the vehicle speed were below the speed at which governor 178 energizes valve 90 simply by opening switch 177. At speeds above the speed at which governor 178 energizes solenoid valve 90, the transmission would remain in overdrive even though switch 177 were opened to select direct drive. To assure a change from overdrive to direct drive operation at any vehicle speed, switch 179 has been provided. As heretofore explained, switch 179 is normally closed and switch 177 is normally open to provide direct drive operation at speeds below 45 miles per hour and overdrive operation at speeds above 45 miles per hour. Continuous overdrive is achieved at all speeds when switch 177 is closed. However, by forcing the accelerator pedal beyond full open throttle position, switch 179 is opened to de-energize solenoid valve 90, thus causing direct drive operation even though governor 178 or switch 177 or both are otherwise operative to select overdrive operation. Actuating switch 179 by pressing the accelerator pedal past full throttle position is a normal maneuver whereby the shift from overdrive to direct drive operation is achieved concurrently with maximum torque demand placed upon the engine. However, unless the accelerator pedal is depressed beyond the position at which fully open engine throttle exists, maximum economy of operation through the overdrive gearing is maintained.

Valves 117 and 131 are effective to connect ports 120 and 134, respectively, to passage 169 only when the clutch pedal is forced downwardly past the neutral or no-drive position. Thus, neutral condition of operation may obtain without applying clutch brake 61, as for vehicle coasting. When, however, the clutch pedal is depressed past neutral, oil pressure will be admitted to chamber 43 to apply clutch brake 61.

By this invention there has been provided a double clutch unit and control system adapted normally to provide for direct drive operation up to a maximum vehicle speed and overdrive operation thereafter. By one manual overcontrol, the system may be caused to provide for continuous overdrive operation at all vehicle speeds. By a second overcontrol, downshift from overdrive to direct drive may be accomplished independently of vehicle speed or the previously mentioned overcontrol. It will be understood, however, that the manually controlled, downshift controlled by the accelerator pedal is effective only so long as the accelerator pedal is fully depressed. If the vehicle speed is above 45 miles per hour, upshift to overdrive will occur simply by releasing the pedal to full throttle position.

In Figure 2, the manual high-low switch 177 is illustrated in its open or direct drive position. Accelerator pedal overcontrol switch 179 is illustrated in its closed position. Governor 178 is effective to de-energize solenoid valve 90 until a vehicle speed of 45 miles per hour is attained. At such speed the governor operates to energize switch 90 to cause shift from direct to overdrive operation. Thus switch 177 constitutes a manual overcontrol of governor 90, switch 177 being effective to select overdrive operation at all vehicle speeds when closed. Accelerator pedal operated switch 179, on the other hand, acts as an overcontrol on both switch 177 and governor 90, switch 179 being effective to select downshift to direct drive at all vehicle speeds when open. In Figure 2, clutch control valves 118 and 132 are illustrated in the position they assume when the clutch pedal has just started from its depressed or neutral position to a released or clutch engaging position. The transmission would be in direct drive if the engine were running to drive pump 59.

The preceding description recites the objects, advantages and useful results of this invention which incorporates a number of novel features in combination, which are subject to changes in specific arrangement and forms of structure without departing from the spirit and scope of the invention as defined in the following claims.

I claim:

1. In combination in a vehicle, a two speed transmission, a pair of clutch plates operable to establish different drive conditions of transmission operation, a presser plate disposed between said clutch plates, a piston for actuating said presser plate, fluid pressure chambers at opposite sides of said piston for controlling said piston and presser plate, a fluid pressure source, a clutch pedal, and a pair of valves operable by said clutch pedal for controlling the admission of fluid pressure to said pressure chambers, said valves being effective in one position of said clutch pedal to connect both of said fluid pressure chambers to said fluid pressure source to establish neutral condition of transmission operation.

2. In combination in a vehicle, a two speed transmission, a pair of clutch plates operable to establish different drive conditions of transmission operation, a presser plate disposed between said clutch plates, a piston for actuating said presser plate, fluid pressure chambers at opposite sides of said piston for controlling said piston and presser plate, a fluid pressure source, a clutch pedal, and a pair of valves operable by said clutch pedal for controlling the admission of fluid pressure to said pressure chambers, said valves being effective when said clutch pedal is depressed to admit fluid pressure to both of said chambers to disengage said presser plate from both of said clutch plates to establish neutral condition of transmission operation.

3. In combination in a vehicle, a two speed transmission unit having a power input and a power output shaft, a pair of clutch plates operable to establish different conditions of transmission operation, a presser plate common to both of said clutch plates, a piston for actuating said presser plate, a pair of pressure chambers associated with said piston, a hydraulically actuated brake for braking said power output shaft, a fluid pressure source, a clutch pedal, and valve means actuated by said clutch pedal for controlling the admission of fluid pressure from said source to said pair of chambers associated with said piston and to said hydraulically actuated brake.

4. In combination in a vehicle, a two speed transmission unit having a power input and a power output shaft, a pair of clutch plates operable to establish different drive conditions of transmission operation, a presser plate disposed between said clutch plates adapted to alternately engage said clutch plates or to be disengaged from both of said clutch plates, a piston for actuating said presser plate, a pair of pressure chambers operatively associated with said piston, a hydraulically actuated brake for braking said output shaft, a fluid pressure source, a clutch pedal having a normal range of movement and movable beyond said normal range of movement, valve means actuated by said clutch pedal in its normal range of movement for controlling the admission of fluid pressure from said source to said pressure chambers, and valve means operable by said clutch pedal when said pedal is moved beyond its normal range of movement for admitting fluid pressure from said source to said brake for braking said transmission output shaft.

5. In combination in a vehicle, a two speed transmission unit having a power input and a power output shaft, a pair of clutch plates operable to establish neutral, direct, or overdrive operation of said transmission unit, a presser plate disposed between said clutch plates adapted to alternately engage said clutch plates or to be disengaged from both of said clutch plates, a clutch actuating servo including a piston having fluid pressure chambers at opposite sides thereof, a brake mechanism for braking said power output shaft including a servo for actuating said brake, a clutch pedal having a normal range of movement and movable beyond said normal range of movement, a fluid pressure source, valve means actuated by said clutch pedal and effective in the normal range of operation of said clutch pedal to direct fluid pressure from said source to both of said clutch piston pressure chambers for establishing neutral condition of transmission operation, and additional valve means operated by said clutch pedal when said clutch pedal is moved beyond its normal range of movement for admitting fluid pressure from said source to said brake servo for braking said transmission output shaft.

6. In combination, a two speed transmission unit having power input and power output shafts, a pair of clutch plates operable to establish different conditions of transmission operation, a presser plate disposed between said clutch plates, a piston for actuating said presser plate, a fluid pressure chamber at each side of said piston, a hydraulically actuated brake for braking said power output shaft, a fluid pressure source, valve means for controlling the admission of pressure from said source to said clutch piston pressure chambers, additional valve means for controlling the admission of fluid pressure to said hydraulically actuated brake for braking said transmission power output shaft, and a common manually controlled lever for actuating both of said valve means.

7. In combination, a two speed transmission unit having power input and power output shafts, a pair of clutch plates for establishing different conditions of transmission operation, a presser plate disposed between said clutch plates, a piston for actuating said presser plate, a pair of fluid pressure chambers operatively associated with said piston, a hydraulically actuated brake for braking said output shaft, a fluid pressure source, valve means for controlling the admission of pressure fluid from said source to said clutch piston pressure chambers, additional valve means for controlling the admission of pressure fluid to said brake for braking said power output shaft, and a common manually controlled lever movable through a normal range of operation for controlling said first-mentioned valve means and movable beyond said normal range of operation for controlling said additional valve means to apply said brake to said power output shaft.

8. In combination in a vehicle, a two speed transmission, a pair of clutch plates operable to establish different conditions of transmission operation, a presser plate movable to establish neutral, direct and overdrive operation of said transmission, a hydraulic servo for actuating said presser plate including a piston and a pair of pressure chambers associated with said piston, a fluid pressure source, a clutch pedal, a pair of clutch control valves adapted to be actuated by said clutch pedal, said valves being movable by motion of said clutch pedal in one direction to deliver fluid pressure to both of said servo pressure chambers for establishing neutral condition of transmission operation, said valves being fluid pressure biased to tend to move to a position to exhaust both of said pressure chambers, and means for preventing motion of one of said clutch control valves upon movement of said clutch pedal in the opposite direction.

9. In combination in a vehicle, a two speed transmission, a pair of clutch plates operable to establish different conditions of transmission operation, a presser plate for establishing drive through said transmission, a hydraulic servo for actuating said presser plate including a piston and a pair of fluid pressure chambers associated with said piston, a fluid pressure source, a clutch pedal, a pair of clutch control valves adapted to be actuated by said clutch pedal, said valves being movable by motion of said clutch pedal in one direction to deliver fluid pressure to both of said servo control chambers, said valves being fluid pressure biased to tend to move to a position to exhaust both of said clutch servo pressure chambers, and an additional valve effective in one position to deliver fluid pressure to one of said clutch control valves to prevent motion of said clutch control valve upon movement of said clutch pedal in the opposite direction.

10. In combination in a vehicle, a two speed transmission, a pair of clutch plates operable to establish different conditions of transmission operation, a presser plate movable to establish neutral, direct and overdrive operation of said transmission, a hydraulic servo for actuating said presser plate including a piston and a pair of pressure chambers associated with said piston, a fluid pressure source, a clutch pedal, a pair of clutch control valves adapted to be actuated by said clutch pedal, said valves being movable by motion of said clutch pedal in one direction to direct fluid pressure to both of said servo pressure chambers for establishing neutral condition of transmission operation, said clutch control valves being fluid pressure biased to tend to move to a position to exhaust both of said pressure chambers, an additional valve effective in one position to deliver pressure to one of said clutch control valves for preventing motion of said one clutch control valve upon motion of said clutch pedal in the opposite direction and also effective in a second position to direct fluid pressure to the other of said control valves to prevent movement of said other control valve upon movement of said clutch pedal in said opposite direction, and valve means controlling the position of said additional valve.

11. In combination in a vehicle, a two speed transmission, a pair of clutch plates operable to establish different conditions of transmission operation, a presser plate movable to establish neutral, direct and overdrive operation of said transmission, a hydraulic servo for actuating said presser plate including a piston and a pair of pressure chambers associated with said piston, a fluid pressure source, a clutch pedal, a pair of clutch control valves adapted to be actuated by said clutch pedal, said valves being movable by motion of said clutch pedal in one direction to direct fluid pressure to both of said servo pressure chambers for establishing neutral condition of transmission operation, said clutch control valves being fluid pressure biased to tend to move to a position to exhaust both of said servo pressure chambers, an additional valve effective in one position to deliver fluid pressure to one of said clutch control valves and effective in a second position to deliver fluid pressure to the other of said clutch control valves to prevent movement of the clutch control valve to which fluid pressure is being delivered by said additional valve upon release of said clutch pedal, a master valve yieldably biased to deliver fluid pressure to said additional valve for positioning said additional valve to prevent motion of one of said clutch control valves, and means controlling said master valve to connect said additional valve to exhaust whereby said additional valve is permitted to move to a second position wherein said additional valve is effective to deliver fluid pressure to the other of said clutch control valves for preventing movement thereof and to connect said one clutch control valve to exhaust to permit movement thereof upon release of said clutch pedal.

12. In combination in a vehicle, a two speed transmission including a pair of clutches and a presser plate adapted to alternately engage and release said clutch plates, a clutch actuating servo including a piston and a pair of pressure chambers associated with said piston, a fluid pressure source, a clutch pedal, a pair of clutch control valves adapted to be actuated by movement of said clutch pedal in one direction to deliver fluid pressure to both of said pressure chambers, said clutch control valves being fluid pressure biased to tend to move to a position to exhaust both of said servo pressure chambers, an additional valve effective in one position to deliver fluid pressure to one of said clutch control valves to prevent motion of said valve and effective in a second position to deliver fluid pressure to the other of said clutch control valves to prevent movement of said other control valve upon release of said clutch pedal, means yieldably biasing said additional valve to assume one of said positions, a fluid pressure chamber associated with said additional valve, said additional valve being responsive to fluid pressure delivered to said pressure chamber to assume the other of said positions, master valve means for controlling the admission of fluid pressure to said last-mentioned pressure chamber, and a governor for controlling said master valve.

13. In combination in a vehicle, a two speed transmission including a pair of clutches and a presser plate adapted to alternately engage and release said clutch plates, a clutch actuating servo including a piston and a pair of pressure chambers associated with said piston, a fluid pressure source, a clutch pedal, a pair of clutch control valves adapted to be actuated by movement of said clutch pedal in one direction to deliver fluid pressure to both of said pressure chambers, said clutch control valves being fluid pressure biased to tend to move to a position to exhaust both of said servo pressure chambers, an additional valve effective in one position to deliver fluid pressure to one of said clutch control valves to prevent motion of said valve and effective in a second position to deliver fluid pressure to the other of said clutch control valves to prevent movement of said other control valve upon release of said clutch pedal, means yieldably biasing said additional valve to assume one of said positions, a fluid pressure chamber associated with said additional valve, said additional valve being responsive to fluid pressure delivered to said pressure chamber to assume the other of said positions, master valve means for controlling the admission of fluid pressure to said last-mentioned pressure chamber, a governor for controlling said master valve, and a manual overcontrol for rendering said governor ineffective.

14. In combination in a vehicle, a two speed transmission including a pair of clutches and a pressor plate adapted to alternately engage and release said clutch plates, a clutch actuating servo including a piston and a pair of pressure chambers associated with said piston, a fluid pressure source, a clutch pedal, a pair of clutch control valves adapted to be actuated by movement of said clutch pedal in one direction to deliver fluid pressure to both of said pressure chambers, said clutch control valves being fluid pressure biased to tend to move to a position to exhaust both of said servo pressure chambers, an additional valve effective in one position to deliver fluid pressure to one of said clutch control valves to prevent motion of said valve and effective in a second position to deliver fluid pressure to the other of said clutch control valves to prevent movement of said other control valve upon release of said clutch pedal, means yieldably biasing said additional valve to assume one of said positions, a fluid pressure chamber associated with said additional valve, said additional valve being responsive to fluid pressure delivered to said pressure chamber to assume the other of said positions, master valve means for controlling the admission of fluid pressure to said last-mentioned pressure chamber, a governor for controlling said master valve, and an accelerator pedal actuated overcontrol for rendering said governor ineffective.

15. In combination in a vehicle, a two speed transmission including a pair of clutches and a presser plate adapted to alternately engage and release said clutch plates, a clutch actuating servo including a piston and a pair of pressure chambers associated with said piston, a fluid pressure source, a clutch pedal, a pair of clutch control valves adapted to be actuated by movement of said clutch pedal in one direction to deliver fluid pressure to both of said pressure chambers, said clutch control valves being fluid pressure biased to tend to move to a position to exhaust both of said servo pressure chambers, an additional valve effective in one position to deliver fluid pressure to one of said clutch control valves to prevent motion of said valve and effective in a second position to deliver fluid pressure to the other of said clutch control valves to prevent movement of said other control valve upon release of said clutch pedal, means yieldably biasing said additional valve to assume one of said positions, a fluid pressure chamber associated with said additional valve, said additional valve being responsive to fluid pressure delivered to said pressure chamber to assume the other of said positions, master valve means for controlling the admission of fluid pressure to said last-mentioned pressure chamber, a governor for controlling said master valve, manual control means for rendering said governor ineffective, and an accelerator pedal overcontrol for rendering both said governor and manual control means ineffective.

16. In combination in a vehicle, a two speed transmission including a pair of clutches and a presser plate adapted to establish neutral, direct and overdrive operation of said transmission, a pressure plate movable to establish said conditions of operation, a servo for actuating said presser plate including a piston and a pair of fluid pressure chambers associated with said piston, a fluid pressure source, a clutch pedal, a pair of clutch control valves adapted to be positioned by said clutch pedal to deliver fluid pressure to both of said servo pressure chambers, said clutch control valves being fluid pressure biased to tend to move to a position to exhaust both of said servo pressure chambers, an additional valve effective in one position to deliver fluid pressure to one of said clutch control valves to prevent motion thereof and effective in a second position to deliver fluid pressure to the other of said clutch control valves to prevent motion thereof upon release of said clutch pedal, means yieldably biasing said additional valve to one of said positions, a fluid pressure chamber associated with said additional valve, said additional valve being responsive to fluid pressure delivered to said pressure chamber to assume the other of said positions, and a solenoid valve for controlling the admission of fluid pressure to said last-mentioned fluid pressure chamber.

17. In combination in a vehicle, a two speed transmission including a pair of clutches and a presser plate adapted to establish neutral, direct and overdrive operation of said transmission, a presser plate movable to establish said conditions of operation, a servo for actuating said presser plate including a piston and a pair of fluid pressure chambers associated with said piston, a fluid pressure source, a clutch pedal, a pair of clutch control valves adapted to be positioned by said clutch pedal to deliver fluid pressure to both of said servo pressure chambers, said clutch control valves being fluid pressure biased to tend to move to a position to exhaust both of said servo pressure chambers, an additional valve effective in one position to deliver fluid pressure to one of said clutch control valves to prevent motion thereof and effective in a second position to deliver fluid pressure to the other of said clutch control valves to prevent motion thereof upon release of said clutch pedal, means yieldably biasing said additional valve to one of said positions, a fluid pressure chamber associated with said additional valve, said additional valve being responsive to fluid pressure delivered to said pressure chamber to assume the other of said positions, a solenoid valve for controlling the admission of fluid pressure to said last-mentioned chamber, and a manually operable switch for controlling said solenoid valve.

18. In combination in a vehicle, a two speed transmission including a pair of clutches and a presser plate adapted to establish neutral, direct and overdrive operation of said transmission, a presser plate movable to establish said conditions of operation, a servo for actuating said presser plate including a piston and a pair of fluid pressure chambers associated with said piston, a fluid pressure source, a clutch pedal, a pair of clutch control valves adapted to be positioned by said clutch pedal to deliver fluid pressure to both of said servo pressure chambers, said clutch control valves being fluid pressure biased to tend to move to a position to exhaust both of said servo pressure chambers, an additional valve effective in one position to deliver fluid pressure to one of said clutch control valves to prevent motion thereof and effective in a second position to deliver fluid pressure to the other of said clutch control valves to prevent motion thereof upon release of said clutch pedal, means yieldably biasing said additional valve to one of said positions, a fluid pressure chamber associated with said additional valve, said additional valve being responsive to fluid pressure delivered to said pressure chamber to assume the other of said positions, a solenoid valve for controlling the admission of fluid pressure to said last-mentioned chamber, a governor actuated switch for controlling said solenoid valve, and a manually operable switch for rendering said governor ineffective.

19. In combination in a vehicle, a two speed transmission including a pair of clutches and a presser plate adapted to establish neutral, direct and overdrive operation of said transmission, a presser plate movable to establish said conditions of operation, a servo for actuating said presser plate including a piston and a pair of fluid pressure chambers associated with said piston, a fluid pressure source, a clutch pedal, a pair of clutch control valves adapted to be positioned by said clutch pedal to deliver fluid pressure to both of said servo pressure chambers, said clutch control valves being fluid pressure biased to tend to move to a position to exhaust both of said servo pressure chambers, an additional valve effective in one position to deliver fluid pressure to one of said clutch control valves to prevent motion thereof and effective in a second position to deliver fluid pressure to the other of said clutch control valves to prevent motion thereof upon release of said clutch pedal, means yieldably biasing said additional valve to one of said positions, a fluid pressure chamber associated with said additional valve, said additional valve being responsive to fluid pressure delivered to said pressure chamber to assume the other of said positions, a solenoid valve for controlling the admission of fluid pressure to said last-mentioned chamber, a manually operable switch for rendering said governor ineffective, and an accelerator pedal operated switch for rendering both said governor and manually operable switch ineffective.

20. In combination in a vehicle, a plural speed transmission, a pair of clutch plates operable to establish different conditions of transmission operation, a presser plate for establishing drive through said transmission, a hydraulic servo for actuating said presser plate including a piston and a pair of control chambers associated with said piston, a fluid pressure source, a manually operable control member, a pair of clutch control valves adapted to be actuated by said control member, said valves being movable by motion of said control member in one direction to deliver fluid pressure to both of said servo control chambers, said valves being biased to tend to move to a position to exhaust both of said servo control chambers, and means effective in one position to prevent motion of one of said clutch control valves upon movement of said manually operable control member in the opposite direction.

21. In combination in a vehicle, a two speed transmission, a pair of clutch plates operable to establish different conditions of transmission operation, a presser plate movable to establish neutral, direct and overdrive operation of said transmission, a hydraulic servo for actuating said presser plate including a piston and a pair of control chambers associated with said piston, a fluid pressure source, a manually operable control member, a pair of clutch control valves adapted to be actuated by said control member, said valves being movable by motion of said control member in one direction to direct fluid pressure to both of said servo control chambers for establishing neutral condition of transmission operation, said clutch control valves being biased to tend to move to a position to exhaust both of said control chambers, means effective in one position to prevent motion of one of said clutch control valves upon motion of said control member in the opposite direction and also effective in a second position to prevent movement of said other clutch control valve upon movement of said control member in said opposite direction, and additional means controlling the position of said means for preventing motion of said clutch control valves.

22. In combination in a vehicle, a plural speed transmission, a pair of clutch plates operable to establish different conditions of transmission operation, a presser plate for establishing drive through said transmission, a hydraulic servo for actuating said presser plate including a piston and a pair of control chambers associated with said piston, a fluid pressure source, a clutch pedal, a pair of clutch control valves adapted to be actuated by said clutch pedal, said valves being effective in one position of said clutch pedal to deliver fluid pressure to both of said control chambers, said valves being biased to tend to move to a position to exhaust both said servo control chambers, and means effective in one position to prevent motion of one of said clutch control valves upon movement of said clutch pedal in a predetermined direction.

References Cited in the file of this patent

UNITED STATES PATENTS

| | | |
|---|---|---|
| 2,079,654 | Linsley | May 11, 1937 |
| 2,120,104 | Livermore | June 7, 1938 |
| 2,352,212 | Lang et al. | June 27, 1944 |
| 2,406,417 | Viviano | Aug. 27, 1946 |
| 2,437,430 | Lawrence | Mar. 9, 1948 |
| 2,485,688 | Banker | Oct. 25, 1949 |
| 2,524,975 | Hobbs | Oct. 10, 1950 |
| 2,604,197 | Livermore | July 22, 1952 |
| 2,635,585 | Livermore | Apr. 28, 1953 |